US009459139B2

(12) United States Patent
Balachandreswaran et al.

(10) Patent No.: US 9,459,139 B2
(45) Date of Patent: Oct. 4, 2016

(54) PHOTOVOLTAIC GENERATING SYSTEM WITH CONTROL UNIT FOR CONTROLLING OUTPUT POWER CONVERSION AND ACTUATION OF PHOTOVOLTAIC TRACKER UNITS

(75) Inventors: Dhanushan Balachandreswaran, Richmond Hill (CA); Michael Sinclair, Toronto (CA)

(73) Assignee: MORGAN SOLAR INC., Toronto, Ontario (CA)

( * ) Notice: Subject to any disclaimer, the term of this patent is extended or adjusted under 35 U.S.C. 154(b) by 699 days.

(21) Appl. No.: 13/605,031

(22) Filed: Sep. 6, 2012

(65) Prior Publication Data

US 2013/0056614 A1 Mar. 7, 2013

Related U.S. Application Data

(60) Provisional application No. 61/531,538, filed on Sep. 6, 2011.

(51) Int. Cl.
*G02B 7/04* (2006.01)
*H01J 40/14* (2006.01)
*G01J 1/02* (2006.01)

(52) U.S. Cl.
CPC ............ *G01J 1/0219* (2013.01); *G01J 1/0242* (2013.01)

(58) Field of Classification Search
CPC .... G01S 3/7861; G01S 3/7862; G01S 3/786; G01S 5/16; G01S 17/66; Y02E 10/50; Y02E 10/52; Y02E 10/56; H02S 10/00; H02S 20/00; H02S 20/10; H02S 20/20; H02S 20/30; H02S 20/32; H02S 30/00; H02S 30/10; H02S 30/20; H02S 40/00; H02S 40/30; H02S 40/32; H02S 40/34; H02S 40/36; H02S 50/00; H02S 50/10; H01L 27/142; H01L 27/144; H01L 27/1446; H01L 31/00; H01L 31/02; H01L 31/02002; H01L 31/02008; H01L 31/04; H01L 31/042; H01L 3131/0445; H01L 31/046; H01L 31/0463; H01L 31/0465; H01L 31/0468; H01L 31/047; H01L 31/0475; H01L 31/05
USPC .......... 250/203.1–203.3, 221, 214 R, 214.1, 250/208.2; 136/243–246, 252, 259; 126/569–578, 593, 600–608, 683–713
See application file for complete search history.

(56) References Cited

U.S. PATENT DOCUMENTS

| 7,371,963 | B2* | 5/2008 | Suenaga | H01L 31/02021 136/205 |
| 8,288,644 | B2* | 10/2012 | Morimoto | 136/244 |
| 8,338,695 | B2* | 12/2012 | Mikhael | F24J 2/38 136/244 |
| 8,344,549 | B2* | 1/2013 | Loh et al. | 307/82 |
| 2007/0102037 | A1* | 5/2007 | Irwin | F24J 2/52 136/246 |
| 2010/0282289 | A1* | 11/2010 | Wu et al. | 136/244 |
| 2010/0282293 | A1* | 11/2010 | Meyer | H01L 31/02008 136/244 |
| 2012/0081088 | A1* | 4/2012 | Park | H02J 7/345 323/282 |

* cited by examiner

*Primary Examiner* — Pascal M Bui Pho
(74) *Attorney, Agent, or Firm* — Ridout & Maybee LLP

(57) ABSTRACT

A photovoltaic (PV) generating system that includes a plurality of PV tracker units, each having: a PV panel with a plurality of PV generators connected to output electrical power and an actuator for positioning the PV panel. A multiple tracker control unit is in communication with the plurality of PV tracker units, the tracker control unit monitoring the output electrical power of the PV panels and controlling, in dependance on the monitored output electrical power, both: (i) power conversion of the output electrical power and (ii) the actuators of the PV tracker units, to optimize power output for the plurality of PV tracker units.

19 Claims, 14 Drawing Sheets

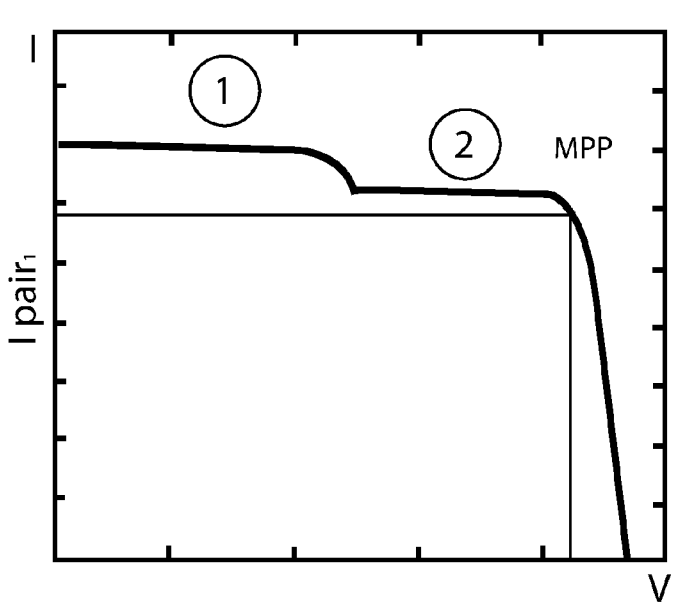
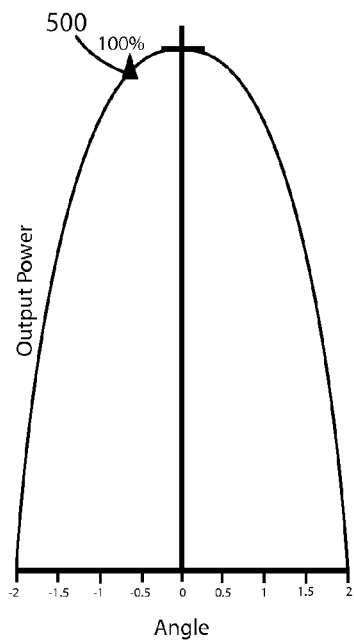
Fig. 5A  Fig. 5B
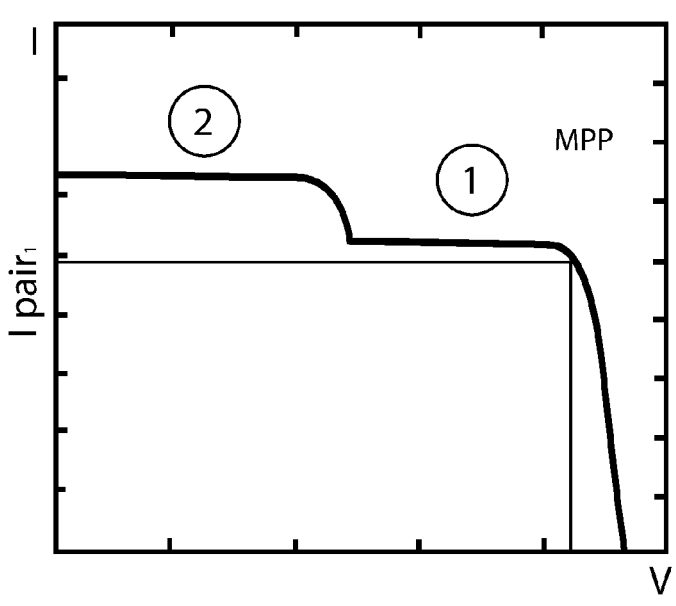
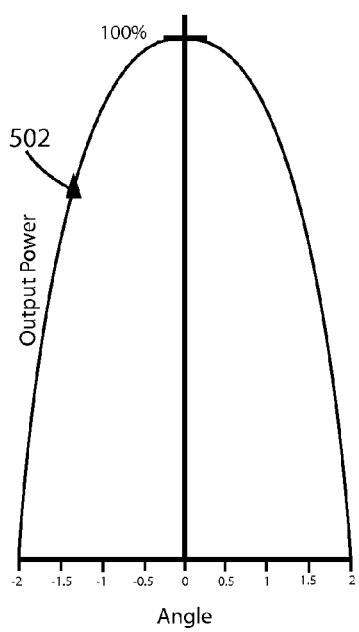
Fig. 6A  Fig. 6B

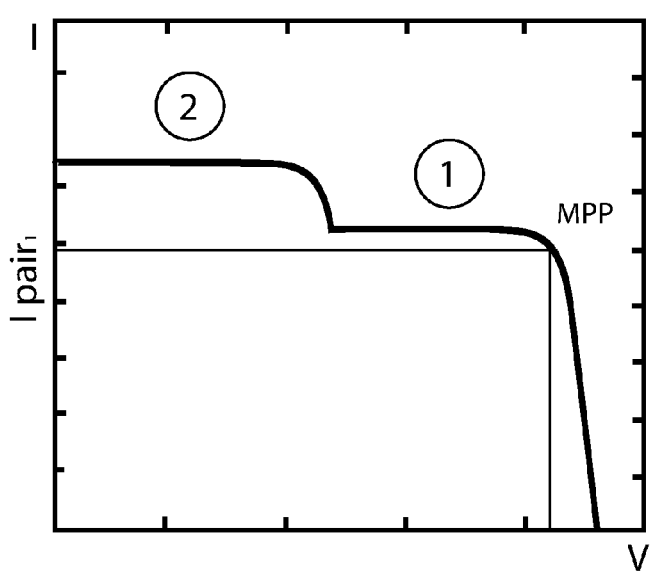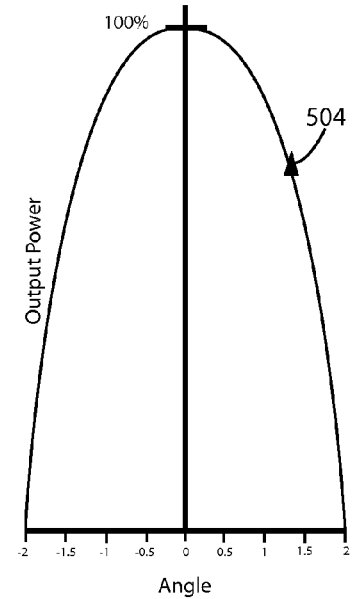
Fig. 7A  Fig. 7B
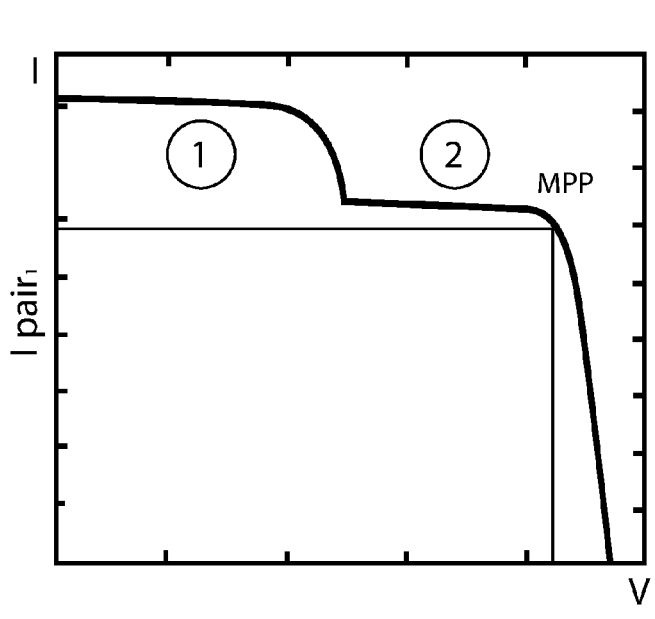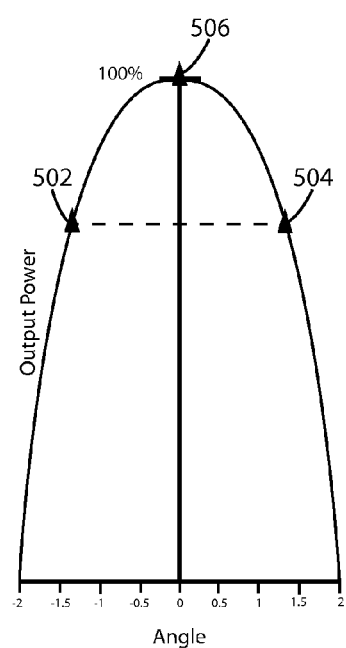
Fig. 8A  Fig. 8B

PHOTOVOLTAIC GENERATING SYSTEM WITH CONTROL UNIT FOR CONTROLLING OUTPUT POWER CONVERSION AND ACTUATION OF PHOTOVOLTAIC TRACKER UNITS

This application claims the benefit of and priority to U.S. Patent Application No. 61/531,538 filed Sep. 6, 2011, the contents of which are incorporated herein by reference.

BACKGROUND

The present disclosure relates to solar energy systems that use either concentrated or non-concentrated photovoltaic units.

SUMMARY

According to an example embodiment, there is provided a maximum power point tracker controller configured to track an orientation of one or more subportions of a solar collector module to obtain a maximum solar radiation capture while also controlling a DC operating voltage for each of said one or more subportions.

According to one example is a photovoltaic (PV) generating system that includes a plurality of PV tracker units, each having: a PV panel with a plurality of PV generators connected to output electrical power and an actuator for positioning the PV panel. A multiple tracker control unit is in communication with the plurality of PV tracker units, the tracker control unit monitoring the output electrical power of the PV panels and controlling, in dependance on the monitored output electrical power, both: (i) power conversion of the output electrical power and (ii) the actuators of the PV tracker units, to optimize power output for the plurality of PV tracker units.

According to one example is a tracker control unit for controlling a plurality of PV tracker units that each have at least one PV panel with PV generators connected to output electrical power and an actuator for positioning the at least one PV panel, the tracker control unit being configured to monitor the output electrical power of the PV panels and control, in dependance on the monitored output electrical power, both: (i) power conversion of the output electrical power and (ii) the actuators of the PV tracker units, to optimize power output for the plurality of PV tracker units.

BRIEF DESCRIPTION OF THE DRAWINGS

FIGS. 5A, 6A, 7A and 8A are illustrations of current to voltage and FIGS. 5B, 6B, 7B and 8B are illustrations of angular acceptance showing calibration of the solar power generating system of FIG. 4;

DESCRIPTION OF EXAMPLE EMBODIMENTS

Figure 1:
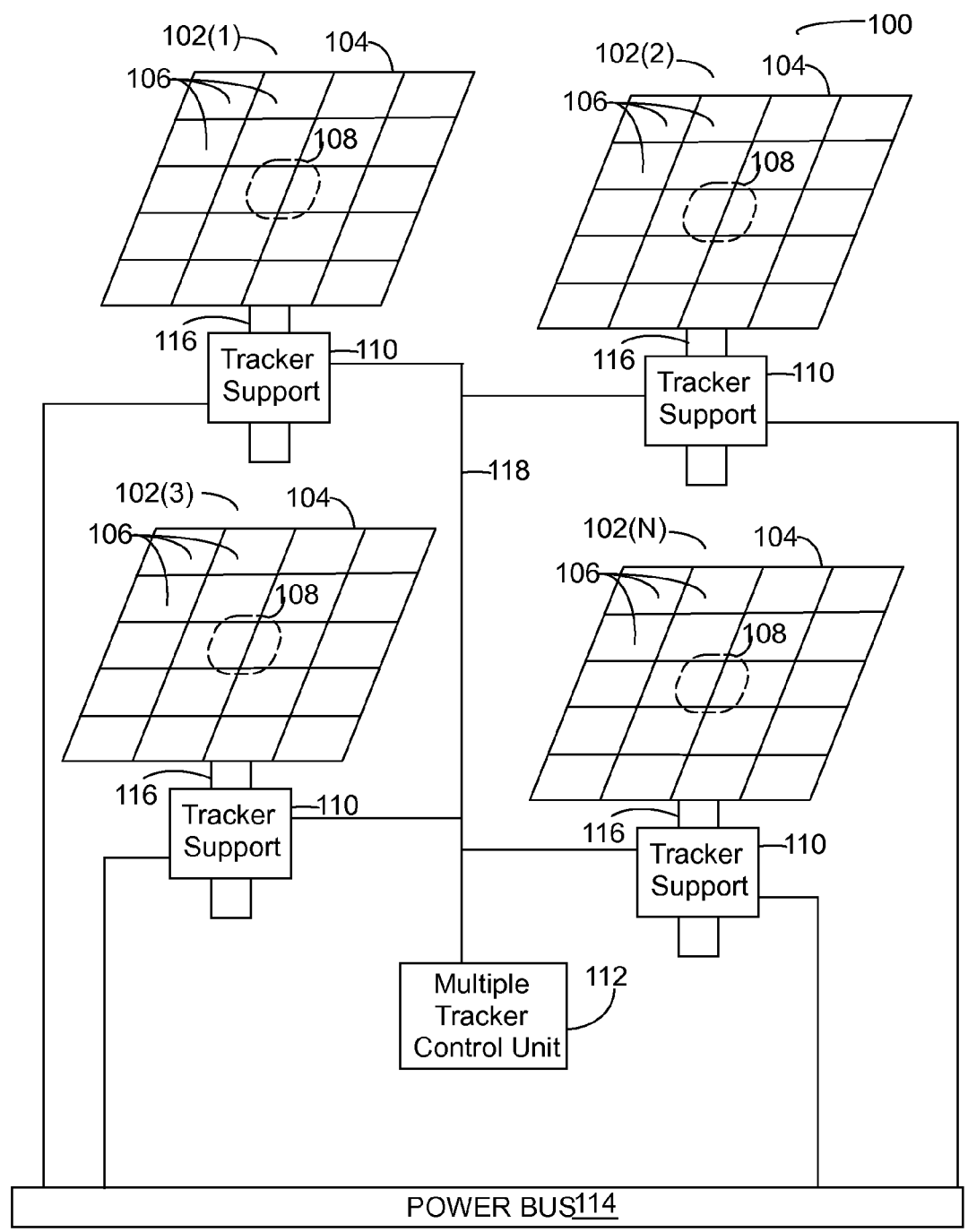
FIG. 1 is a block diagram illustration of a photovoltaic solar power generating system according to an example embodiment.

FIG. 1 illustrates a solar power generating system 100 that includes multiple photovoltaic (PV) tracking units 102(1)-102(N) (each referred to generically as PV tracking unit 102 or 102($j$), where $1<=j<=N$), according to an example embodiment. In the illustrated embodiment of FIG. 1, the system 100 includes four tracking units 102, however the system could include more or less than four tracking units 102. The system 100 can be a stand alone system or a sub-system integrated into a larger power generating plant.

In some embodiments, some or all of the tracker units 102(1)-102(N) may be secured to a common ground mounted frame, such as that described in International Application No. PCT/IB2012/052723, by a tracker support member 116. Each tracker unit 102 includes a dual axis tracker panel 104 that is mounted by an actuator 108 to the tracker support member 116. In an example embodiment, the actuator 108 includes a pair of drive motors and an armature to pivot the tracker panel 104 about two axes (for example elevation and azimuth) to track sun position in the manner described below. Other drive configurations can also be used—for example the actuator 108 may include only a single motor geared to pivot the tracker panel 104 about one axis at a time. The tracker panel 104 includes an array of PV generators 106 for converting solar energy to electricity. In at least some example embodiments, PV generators 106 are concentrated PV modules that each includes a concentrating optical assembly, such as the light-guide solar panel described in U.S. Pat. No. 7,873,257, for concentrating incident sun rays onto a PV cell or receiver. The concentrating optical assembly could by way of example include lenses, reflectors, waveguides and other light-affecting components. Each tracker unit 102 includes a tracker support module 110 that includes electronics for performing DC-DC conversion or DC-AC inversion on power output from the unit's PV generators 106, and also to drive the motor(s) of actuator 108. Within each tracker unit 102 the PV generators 106 may be connected in series or parallel or a combination thereof to provide a collective power signal to tracker support module 110. The tracker support module 110 is connected to output power to a system power bus 114. The individual tracker units 102(1)-102(N) can be connected in parallel or series or combinations thereof to the system power bus 114.

The system 100 includes a multiple tracker control unit 112 that is connected by one or more communication links 118 to exchange information with the tracker support modules 110 of the tracker units 102(1)-102(N). In an example embodiment, multiple tracker control unit 112 is an application specific integrated circuit (ASIC) which, as explained in greater detail below, is configured to support Maximum Power Point Tracking (MPPT) in parallel for the tracker units 102(1)-102(N) as well as support mechanical tracking control in parallel for the tracker units 102(1)-102(N).

Figure 2:
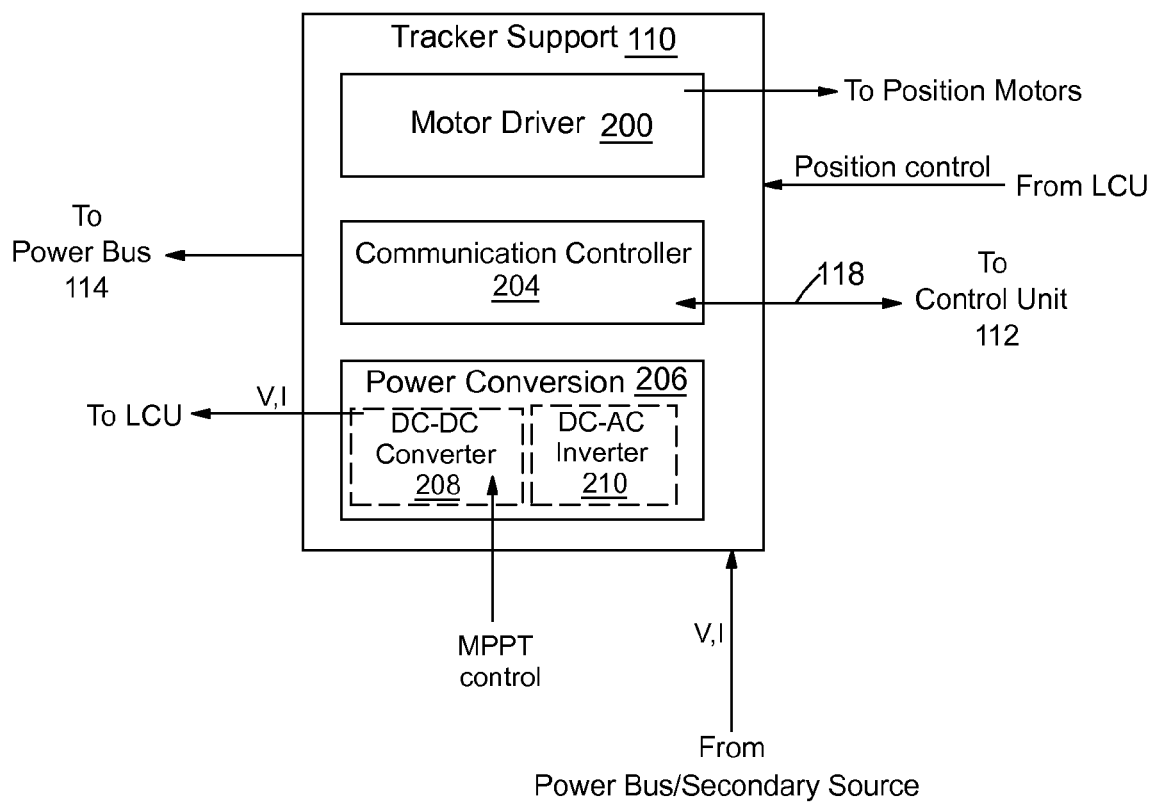
FIG. 2 is a block diagram illustration of a tracker support module used in the system of FIG. 1 according to an example embodiment.

With reference to FIG. 2, the tracker support electronics of each tracker support module 110 will now be explained in greater detail. In at least some example embodiments each tracker support module 110 is located physically proximate to its respective tracker unit 102—for example the electronics that make up support module 110 may be located on a circuit board or circuit boards located within one or more weatherproof enclosures or boxes that are physically secured to the support member 116 or other part of the tracker unit 102. The tracker support module 110 includes motor driver 200, communication controller 204 and power conversion controller 206. Power conversion controller 206 may include a rectifier and DC/DC converter 208 for converting a variable non-constant current and a non-constant voltage received from PV generators 106 into a constant voltage or constant current signal for supply to the power bus 114. Alternatively, the power conversion controller may include a DC-AC inverter 210 for converting the direct current signal received from PV generators 106 into an AC signal for supply to the power bus 114. In an example embodiment, the power conversion module 206 exchanges signals through communication controller 204 and communications link 118 with the multi-tracker control unit 112. In particular, the power conversion module 206 sends signals over link 118 that represent its output power (which for example could be signals that represent output current (I) and voltage (V)) to the multiple tracker control unit 112 and receives MPPT control signals back from the multiple tracker control unit 112 that control its operation to implement MPPT power conversion.

Motor driver 200 is configured to sense the position of tracker panel 104 and control the operation of the drive motor(s) of tracker panel actuator 108. In one example embodiment the tracker panel actuator 108 includes two home position switches for providing position information to the motor driver 200. In an example embodiment, the motor driver 200 exchanges signals through communication controller 204 with the multi-tracker control unit 112. In particular, the motor driver 204 sends signals over link 118 that represent tracker panel position to the multiple tracker control unit 112 and receives position control signals back from the multiple tracker control unit 112 that control its operation to implement solar tracking.

In an example embodiment the communications link 118 between the tracker support module 110 and the multiple tracker control unit 112 may be implemented through power line communications (PLC) such that the same conductors used to provide power to the tracker unit 102 can also be used to facilitate signal communications with the multiple tracker control unit 112, with communication controller 204 performing the function of a PLC interface. However, alternative wired or wireless communications links could be used, including for example a communications link employing the RS-485 standard.

Figure 3:
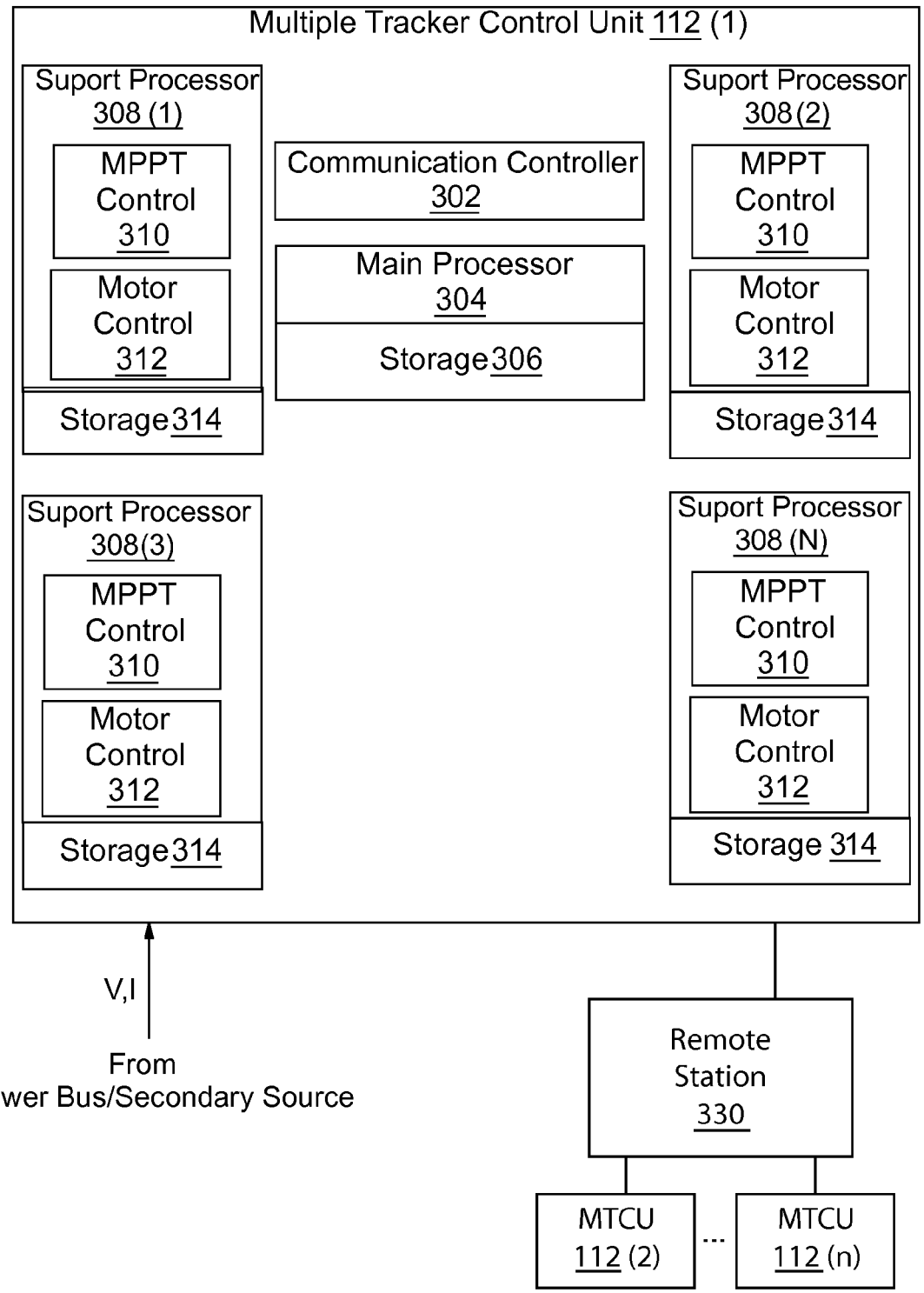
FIG. 3 is a block diagram illustration of a multiple tracker control unit used in the system of FIG. 1 according to an example embodiment.

Referring to FIG. 3, an example embodiment of a multiple tracker control unit 112 will now be described in greater detail. The multiple tracker control unit 112 may be located near the tracker units 102(1)-102(N)—for example, if tracker units 102(1)-102(N) are mounted an a common support frame, the multiple tracker control unit 112 could be located on a circuit board within a weather-proof box or enclosure secured to the common support frame. However, in some embodiments the multiple tracker control unit 112 could be remotely located a distance away from its associated tracker units 102(1)-102(N).

As noted above, in at least some embodiments the multiple tracker control unit 112 is implemented as an ASIC on a single silicon chip and is configured to support Maximum Power Point Tracking (MPPT) in parallel for the tracker units 102(1)-102(N) as well as support mechanical tracking control in parallel for the tracker units 102(1)-102(N). In this regard, the multiple tracker control unit 112 includes multiple processor cores on a single substrate, including a main processor core 304 that has associated storage 306 (which may for example be flash memory), and at least N support processor cores 308(1)-308(N) (referred to generically herein as support processor core 308 or 308(j), where $1 \leq j \leq N$), each having an associated storage 314 (which may for example be flash memory). The support processor cores 308(1)-308(N) are configured to operate in parallel, with each of the processor cores 308(1)-308(N) supporting a respective tracker unit 102(1)-102(N), enabling the multiple tracker control unit 112 to control multiple tracker units 102 simultaneously. In some embodiments, the main processor core 304 is larger and more powerful than the support processor cores 308(1)-308(N)—by way of non-limiting example, the main processor core 304 could be a 32-bit core, whereas the support processor cores 308(1)-308(N) are each 8-bit cores.

In the illustrated embodiment, the multiple tracker control unit 112 includes a communication controller 302 for controlling communications over the communication link 118 between the multiple tracker control unit 112 and the respective tracker units 102(1)-102(N). The main processor core 304 controls and monitors the performance of each of the support processor 308(1)-308(N) and in at least some examples provides performance information through communications link 118 (or a different communications link) to a remote control station 330 that monitors a plurality of multiple tracker control units 112.

Each support processor 308(j) is configured to implement an MPPT control function 310 in order to control power conversion at its respective tracker unit. In this regard, the support processor 308(j) receives a signal or signals representing the output power (for example voltage (V) and current (I)) as produced by the power conversion module 206 for its respective tracker unit 102(j). The MPPT control function 310 implements any acceptable MPPT control algorithm (acceptable algorithms include but are not limited to one or more of: perturb and observe, incremental conductance, constant voltage and current feedback) and provides MPPT control signals that are transmitted back through communications link 118 to the power conversion module 206 of tracker unit 102(j) in order to achieve electrical MPPT for the tracker unit 102(j).

The PV tracker panels 104 have mechanical acceptance angles relative to the sun's rays, and accordingly each support processor 308(j) is further configured to implement a tracker motor control function 312 in order to control the orientation of the tracker panel 104 of its respective tracker unit 102(j) to optimize PV panel efficiency. The motor control function 312 implements a tracking algorithm to generate position control signals that are transmitted over communications link 118 to the motor driver 200 of its respective tracker unit 102(j).

In one example embodiment, the tracking algorithm used by motor control function 312 is a hybrid or calibrated open-loop method for optimizing panel positioning or trajectory. In particular, astronomical data and tracker location and position information is stored in the storage of the control unit 112 or accessible to the multiple tracker control unit 112 such that the motor control function 312 can calculate the sun's position relative to the tracker panel 104 and a target panel position (for example azimuth and elevation) in order to adjust the panel position to track the sun through the course of a day. In order to further improve tracking accuracy and adjust for any manufacturing or assembly variations of the tracker unit 102(j) or uneven terrain or imperfect installation, the motor control function 312 is further configured to perform a calibration function to correct the open-loop trajectory used by the motor control function 312. In this regard, during a trajectory calibration cycle, the tracker motor control function 312 of the support processor 308(j) also receives a signal or signals representing the output power (for example one or both of voltage (V) and current (I)) as produced by the power conversion module 206 for its respective tracker unit 102(j). During the calibration cycle, the tracker motor control function 312 acquires calibration data at a series of panel positions as the PV panel moves through its default trajectory over a predetermined time period (by way of non-limiting example, calibration data could be obtained six to twelve times a day for a period of 1-3 days). At each of the calibration data sample points, panel alignment is adjusted relative to the position calculated based on astronomical data to determine at which panel elevation and azimuth the instantaneous power output from power conversion module 206 is maximized. By way of example, the elevation and azimuth may each be individually incrementally adjusted until the maximum or optimum power for each movement axis is determined for the sample point. Using such information, a calibrated trajectory is calculated for the tracker unit 102(j), and the calibrated trajectory subsequently used as the default trajectory by the motor control function 312 to control the operation of the motor driver 200 of its respective tracker unit 102(j).

The calibration routine may automatically be performed on post-installation system setup, or may be manually triggered locally or remotely by an operator. In some examples the calibration routine may be periodically performed automatically after a predetermined period elapses or a predetermined trigger event occurs. In some example embodiments, one or more of the support processor core 308(j), the main processor core 304, or a remote controller may be configured to track if the instantaneous power output for a tracker unit 102(j) falls below threshold performance levels and cause the calibration routine to be automatically performed as a result. In some example embodiments, the tracker control unit may be automatically configured to perform the calibration routine on start up after the solar power generating system has detected and been subjected to a climate event such as a wind storm.

In some example embodiments, the motor control function 312 may be configured to implement closed-loop tracking in which PV tracking unit output power is monitored on an on-going basis and motor driver 200 controlled to continuously or nearly continuously maximize instantaneous power output for a tracker unit 102(j).

In an alternative example embodiment, rather than using instantaneous power as a tracking input, a sun sensor could be provided on each of the solar tracker panels 104 and the information from the sun sensor provided to the motor control functions 312 of support processor cores 308(1)-308(N) in place of the power output of power conversion module 206. In some example embodiments, the input from a sun sensor could be used to supplement instantaneous power information as a tracking input to motor control function 312.

The tracker support units 110 and the multiple tracker control unit 112 can draw power from the power bus 114, or they may be powered by secondary PV cells, batteries or any other secondary source of power.

Figure 4:
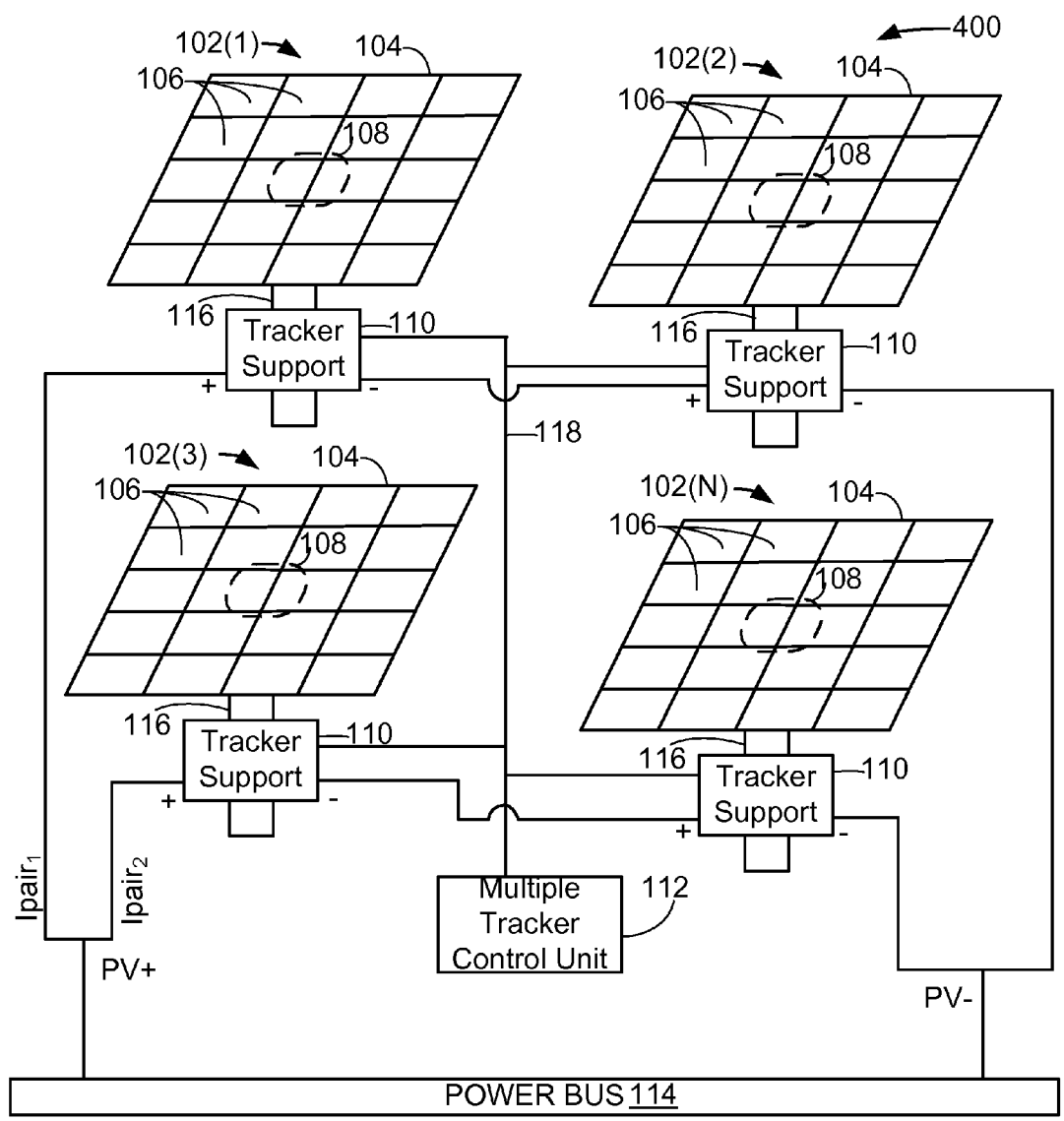
FIG. 4 is a block diagram illustration of a photovoltaic solar power generating system according to a further example embodiment.

FIG. 4 discloses a further embodiment of a solar power generating system 400 that is substantially identical to the above-described solar power generating system 100 except for differences that will be apparent from the Figures and the following description. In solar power generating system 400, the tracker units 102(1)-102(N) are paired up with one pair of units 102(1) and 102(2) connected in series, the other pair of units 102(3) and 102(N) connected in series, and the two pairs connected in parallel. In solar generating system 400, the tracker position calibration routine used to establish panel trajectory is performed jointly for each serially connected tracker unit pair. In this regard, the multiple tracker control unit 112 receives as inputs the signals representative of output current Ipair$_1$ for serially connected tracker units 102(1) and 102(2) and the output current Ipair$_2$ for serially connected units 102(3) and 102(N The presently described calibration routine may in some applications permit two tracker units, with panels 104 wired in series, to remain operational while being calibrated by monitoring the output current of the panel pair, thereby allowing the tracker panels 104 to continue producing power throughout calibration with only relatively minor losses.

An example of a tracker trajectory calibration performed by the tracker control unit 112 to obtain calibration data for a calibration point for serially connected tracker units 102(1) and 102(2) will be described with reference to the illustrations shown in FIGS. 5A-8B. The illustrations in FIGS. 5A, 6A, 7A and 8A represent the IV curve of the pair of tracker units 102(1) and 102(2) and the illustrations in FIGS. 5B, 6B, 7B, and 8B represent output power vs. angle, or angular acceptance, of the panels 104 of the pair of tracker units 102(1) and 102(2). The multiple tracker control unit 112 receives as an input a representation of the current Ipair$_1$ at the Maximum Power Point (MPP) for the pair of panels 104 of tracker units 102(1) and 102(2). From FIG. 5A it is evident that the two panels of tracker units 102(1) and 102(2) are uncalibrated and misaligned relative to one another. The calibration begins by picking one axis of the actuator 108 of tracker unit 102(1) and moving it in an arbitrary direction—by moving the panel and comparing power from different angles an angular acceptance pattern can be determined. As shown by the triangular marker 500 in the angular acceptance illustration (FIG. 5B) that corresponds to the illustration of FIG. 5A, panel 104 of tracker unit 102(1) is not perfectly aligned with the sun even though it is outperforming the panel 104 of tracker unit 102(2). In FIG. 6A, the panel 104 of tracker unit 102(1) has been moved far enough out of alignment to register a drop in MPP (which can be measured using the current Ipair$_1$). Note that initially, the MPP for the pair of panels would not have moved because the panel 104 of tracker unit 102(1) was performing better than panel 104 of tracker unit 102(2). Only when the performance of the panel of tracker unit 102(1) drops below that of the panel of tracker unit 102(2) would the current Ipair$_1$ drop, representing a drop in MPP.

Figure 9:
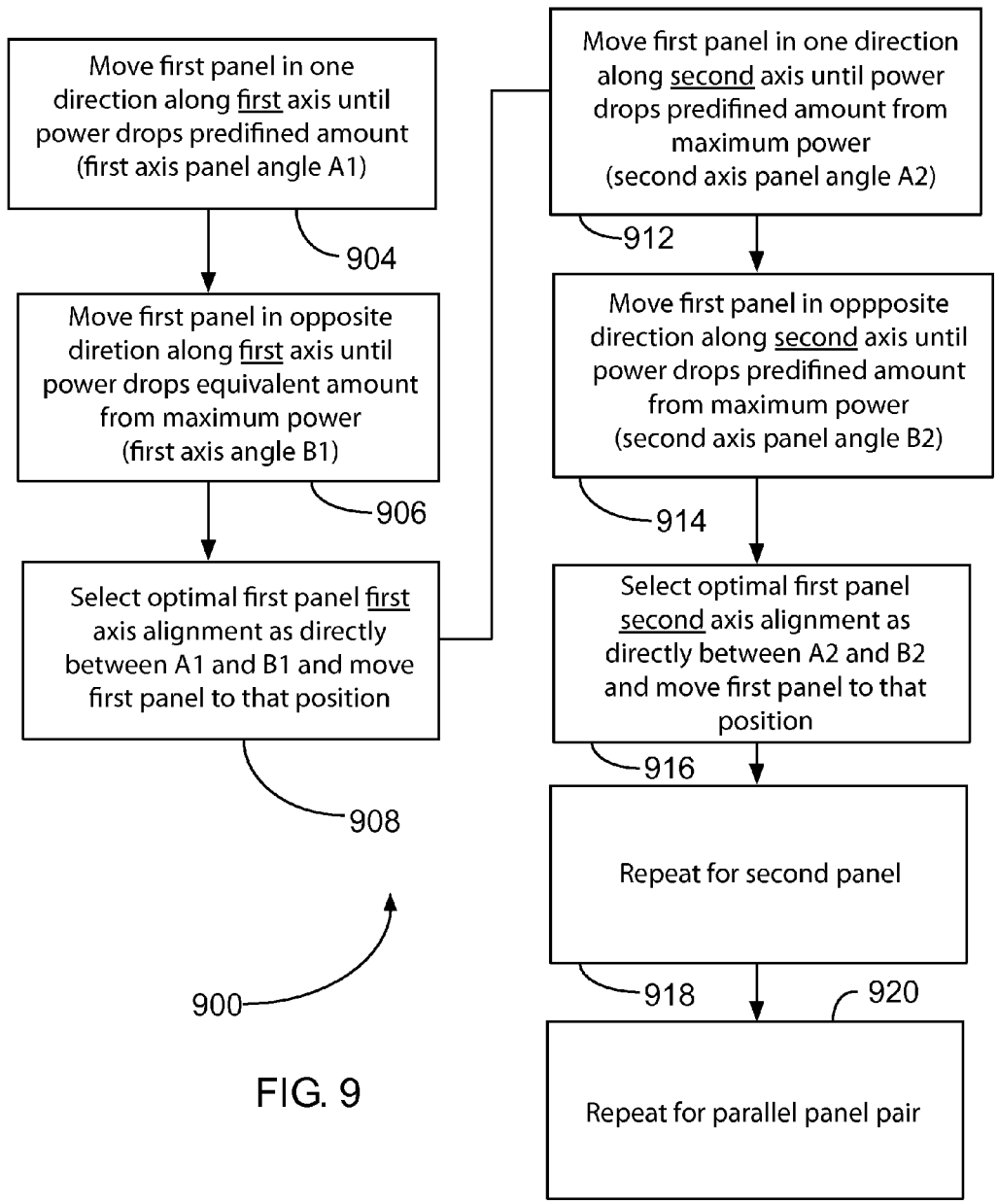
FIG. 9 is a flow diagram illustrating calibration of the solar power generating system of FIG. 4.

FIG. 6B illustrates how far the panel of tracker unit 102(1) has deviated from perfect alignment. Once a pre-defined drop in power (as indicated by Ipair$_1$ and illustrated in FIG. 6B by triangular marker 502) has been detected by multiple tracker control unit 112, the multiple tracker control unit 112 will drive the tracker actuator 108 of tracker unit 102(1) to move the tracker panel of unit 102(1) in the other direction (on the same axis). In FIG. 7A, the tracker panel of unit 102(1) has moved all the way past its optimal alignment until the current Ipair$_1$ indicates the same pre-defined performance drop as in FIG. 6A (as illustrated by triangular marker 504 in FIG. 7B). The optimal alignment for the axis is estimated to be directly between the tracker panel location in FIGS. 6B and 7B as illustrated by triangular marker 506 shown in FIG. 8B. In FIGS. 8A, 8B the tracker panel 104 of tracker unit 102(1) is optimally aligned, however the MPP remains unchanged until the same calibration is carried out for the panel 104 of tracker unit 102(2). The calibration process illustrated in FIGS. 5A-8B needs to be repeated for both axes of each tracker panel. In some embodiments, the process can be repeated closer and closer to the estimated position for optical alignment for each axis in order to fine tune the calibration. FIG. 9 represents the calibration routine illustrated by FIGS. 5A-8B in a flow diagram as calibration process 900. During calibration process 900, the tracker control unit 122 controls the power conversion modules 206 of the respective panels to provide electrical MPPT power conversion throughout the calibration process.

The calibration process 900 is implemented by multiple tracker control unit 112, which receives as inputs panel position information from the tracker support units 110 of the respective tracker units 102(1)-102(N) and MPP feedback information for each panel pair in the form of Ipair$_1$ and Ipair$_2$. Based on these inputs, the multiple tracker control unit 112 provides control signals to the respective tracker support units 110 to control MPPT power conversion at the tracker unit power conversion modules 206 and control the tracker unit motor drivers 200.

The calibration process 900 of FIG. 9 can be carried out periodically during a system calibration period to set a number of measured calibration data points that can be used to adjust an astronomically based trajectory—by way of non-limiting example, as with system 100, the calibration process 900 could be performed at six to twelve trajectory points a day for a period of 1-3 days. As indicated at action 904, the first panel of serially connected tracker units 102(1) and 102(2) is moved in one direction along a first axis (for example the elevation axis) until the panel pair output power drops a predetermined amount and the corresponding panel angle A1 recorded, after which the first panel is moved in the opposite direction along the same axis until the panel pair output power equals that of panel angle A1 and the corresponding panel angle B1 is recorded (action 906). The optimal panel alignment for the first axis for the first panel is set to be directly between A1 and B1 (action 908). The optimal panel alignment for the second axis (for example the azimuth) for the first panel is then determined in a similar manner: the panel of tracker unit 102(1) is moved in one direction along the second axis until the output power for the panel pair drops a predetermined amount and the corresponding panel angle A2 is recorded (action 912), after which the first panel is moved in the opposite direction along the same axis until the panel pair output power equals that of the panel angle A2 and the corresponding panel angle B2 is recorded (action 914). The optimal panel alignment for the second axis for the first panel is set to be directly between A2 and B2 (action 916). Actions 904-916 are then repeated for the second panel in the serially connected pair—panel 104 of tracker unit 102(2) (action 918), and then the process repeated again for the next serially connected pair—tracker units 102(3) and 102(N) (using Ipair$_2$ as the power input for calibration of tracker units 102(3) and 102(N)).

The process 900 can in some applications be appropriate for imperfect optics in CPV systems having an asymmetric angular acceptance because it is conservative to align the panel to the half-way point between the two shoulders of the angular acceptance illustration.

Although system 100 shows four panels connected in parallel and system 400 includes two parallel connected pairs of serially connected panels, the calibration and control methods described herein could also be configured for different numbers of panels and different series/parallel panel configurations.

In an example embodiment, the calibration algorithm for each tracking unit 101(j) is carried out by the corresponding support processor core 308(j) of the multiple tracker control unit 112. In some alternative example embodiments, the calibration algorithm for each tracking unit 101(j) is carried out at the main processor core 304, with post-calibration tracking control being provided by the respective support processor cores 308(j). In the above-described embodiments, the multiple tracker control unit 112 is shown as having a support processor core 308(j) for each tracker unit 102(j). However, in some alternative embodiments, the number of support processor cores 308 could be less than the number of tracker units 102, with at least some support processor cores 308 supporting MPPT and tracker trajectory calculations for multiple tracker units 102. Additionally, in some alternative embodiments, the multiple tracker control unit 112 could include multiple support processor cores 308 to control each tracker unit 102—for example one support processor core 308 could be used to implement MPPT power conversion function 310 for a tracker unit and another support processor core 308 used to implement tracker trajectory calibration and control function 312 for the same tracker unit.

Figure 10:
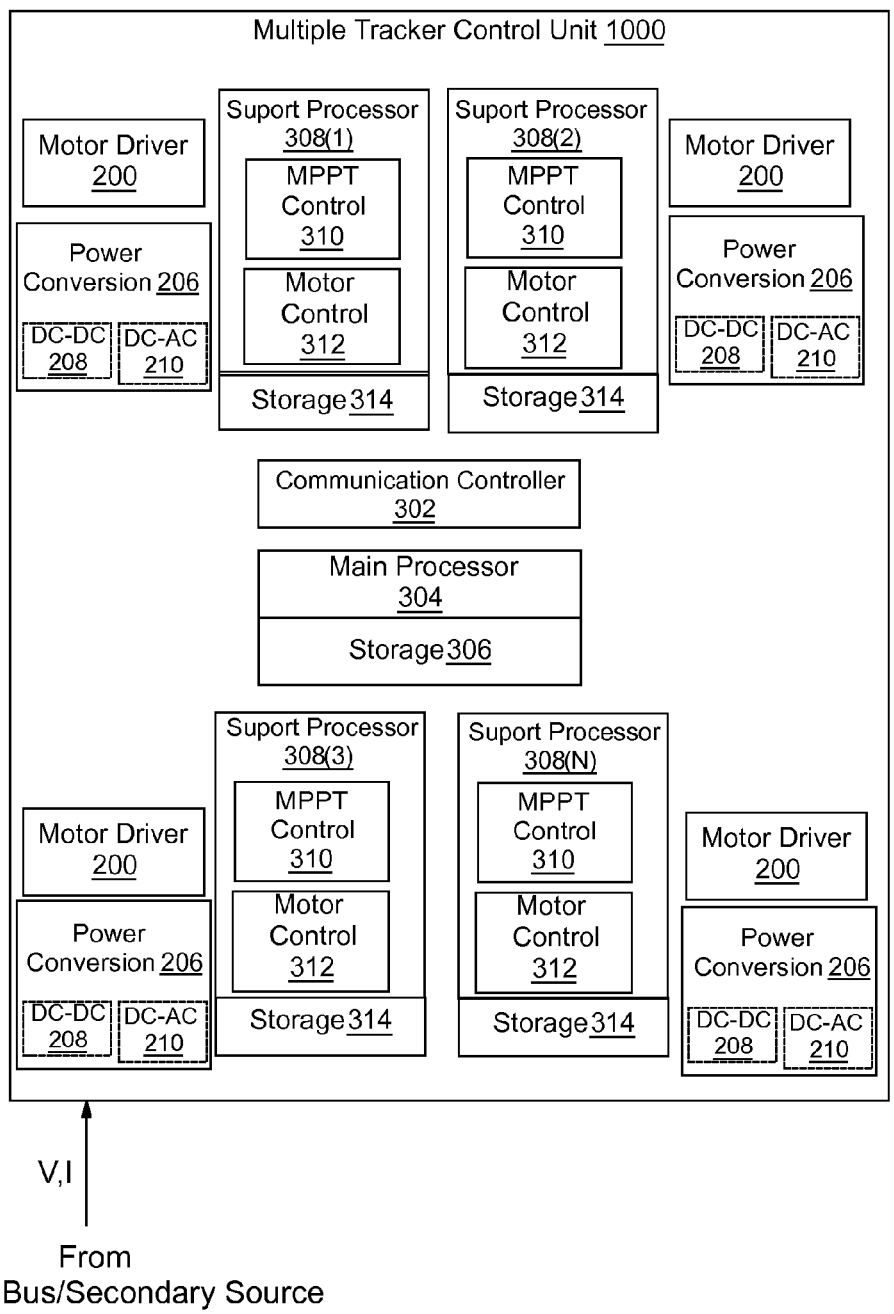
FIG. 10 is a block diagram illustration of a multiple tracker control unit for application to the system of FIG. 1 according to a further example embodiment.

In some example embodiments, some of the electronics of the individual tracker support units 110 may be moved from the tracker units 102 to the multiple tracker control unit 112. In this regard, FIG. 10 shows a block diagram of an alternative embodiment of a multiple tracker control unit 1000 that is substantially identical to multiple tracker control unit 112 with the exception of differences that will be apparent from the Figures and the following description. In multiple tracker control unit 1000, the motor driver module 200 and power conversion module 206 electronics from each of the tracker units 102(1)-102(N) have been moved from respective tracker support units 110 to the multiple tracker control unit 112. A configuration such as shown in FIG. 10 could be appropriate in lower power systems where the inverter 210 and/or converters 208 included in the electronics of power conversion module 206 can be adequately temperature controlled. In some example embodiments, the electronics to implement motor driver module 200 can be moved to the multiple tracker control unit 112 independent of the electronics for implementing power conversion module 206, and vice versa.

As described above, in an example embodiment, multiple tracker control unit 112 and tracker control unit 1000 are each implemented as a multi-processor core single chip ASIC. However, in some example embodiments the multiple tracker control unit 112 and tracker control unit 1000 could each be implemented as a chip set of multiple chips secured to a substrate such as a circuit board.

Figure 11:
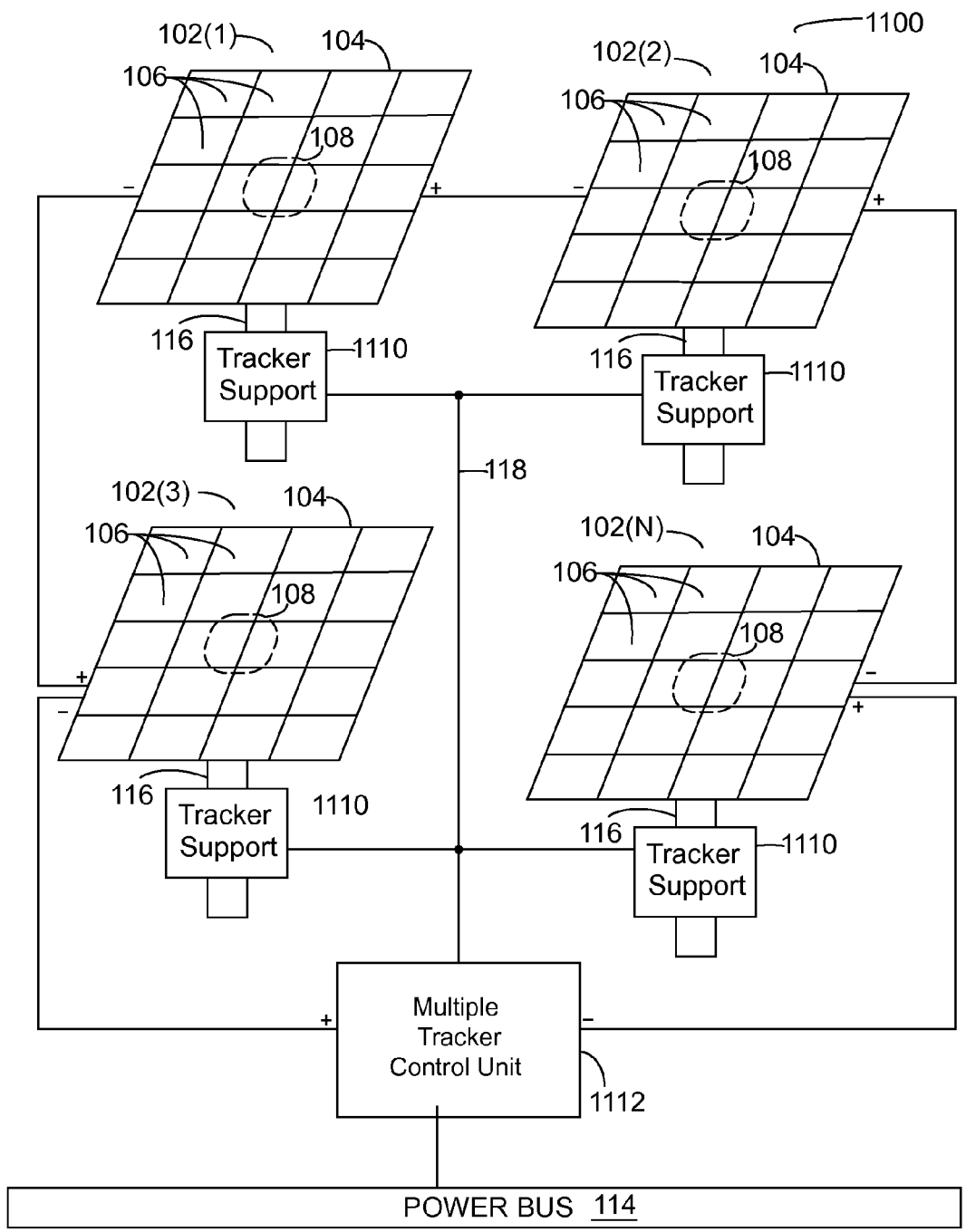
FIG. 11 is a block diagram illustration of a photovoltaic solar power generating system according to a further example embodiment.
Figure 12:
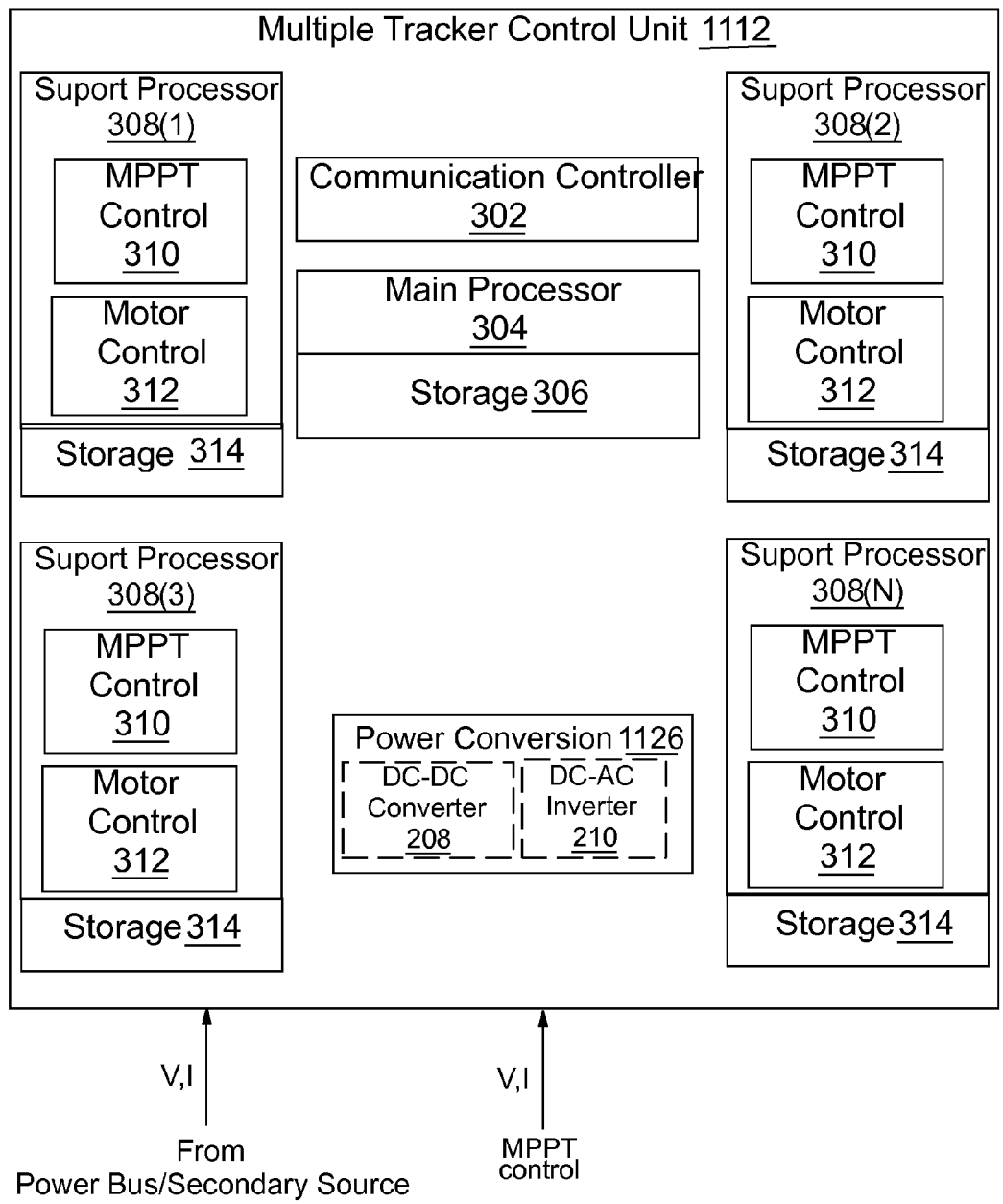
FIG. 12 is a block diagram illustration of a multiple tracker control unit used in the system of FIG. 11 according to an example embodiment.
Figure 13:
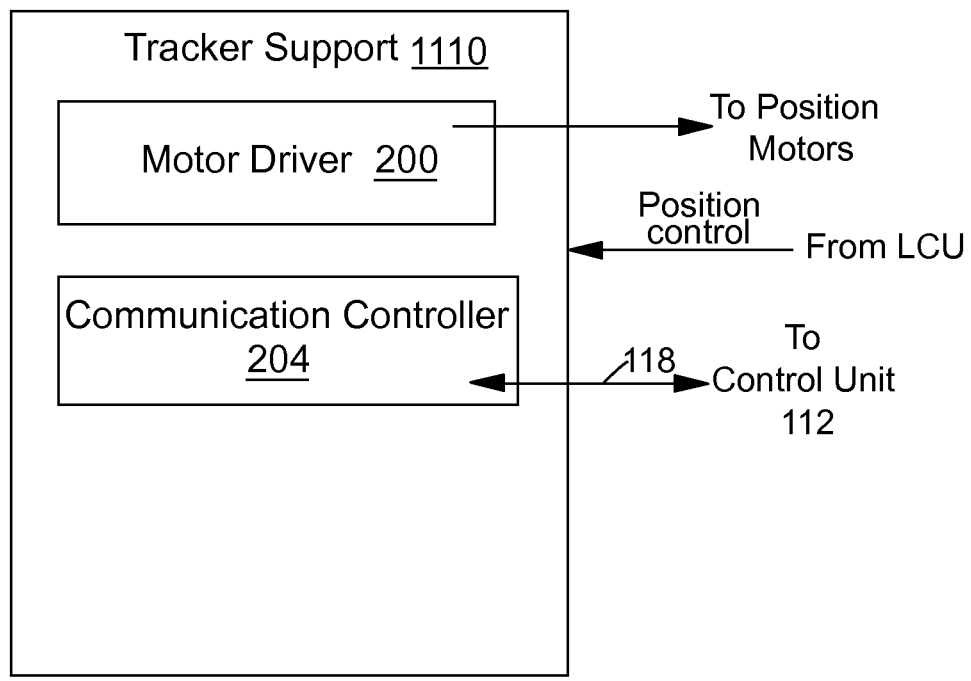
FIG. 13 is a block diagram illustration of a tracker support module used in the system of FIG. 11 according to an example embodiment.

FIGS. 11-13 disclose a further embodiment of a solar power generating system 1100 that is similar to the above-described solar power generating system 100 except for differences that will be apparent from the Figures and the following description. In solar power generating system 1100 shown in FIG. 11, the tracker units 102(1)-102(N) are connected in series. In the illustrated embodiment, the multiple tracker control unit includes a central power conversion module 1126. The single power conversion module 1126 may include a DC/DC converter for regulating the voltage or current of all the tracker units 201(1)-102(N) and a DC/AC inverter for converting the direct current signal received from PV generators 106 into an AC signal for supply to the power bus 114. A corresponding simplified tracker support unit 1110 is shown in FIG. 13, which does not include the power conversion module 206 electronics. In the embodiment shown in FIGS. 11-13, the support processor cores 308 transmit and receive motor control signals via the communication controllers 204, 302 and communications link 118 to communicate with the motor driver 200 of the tracker support 1110.

Figure 14:
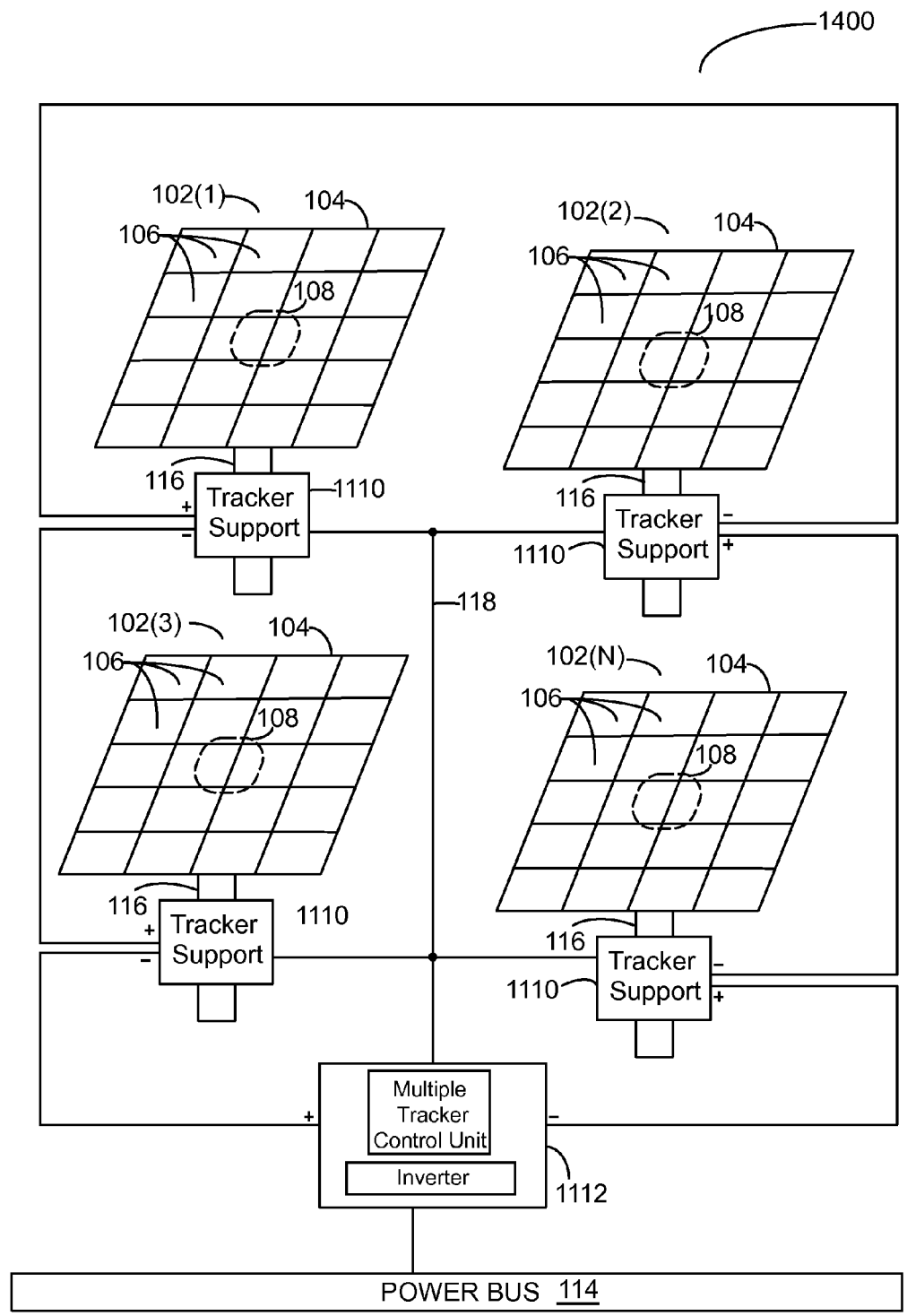
FIG. 14 is a block diagram illustration of a photovoltaic solar power generating system according to yet another example embodiment.
Figure 15:
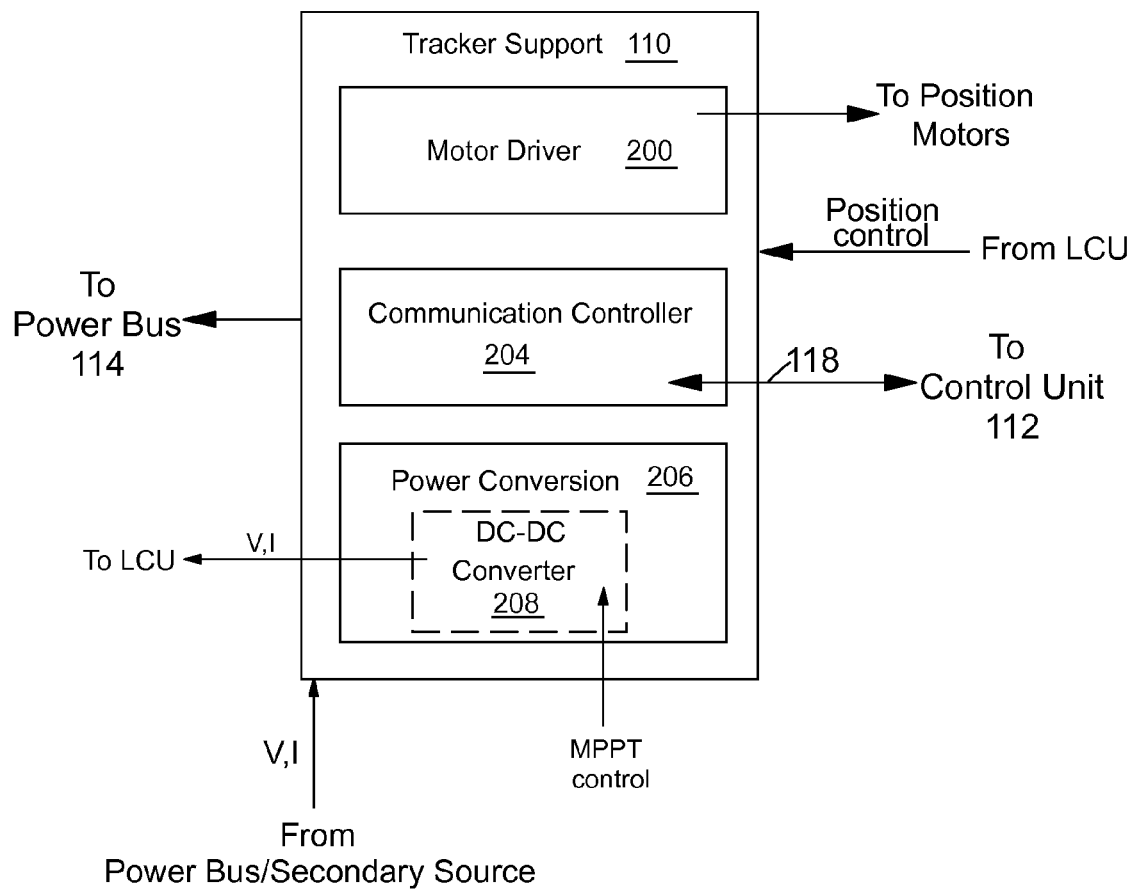
FIG. 15 is a block diagram illustration of a tracker support module used in the system of FIG. 14 according to an example embodiment.
Figure 16:
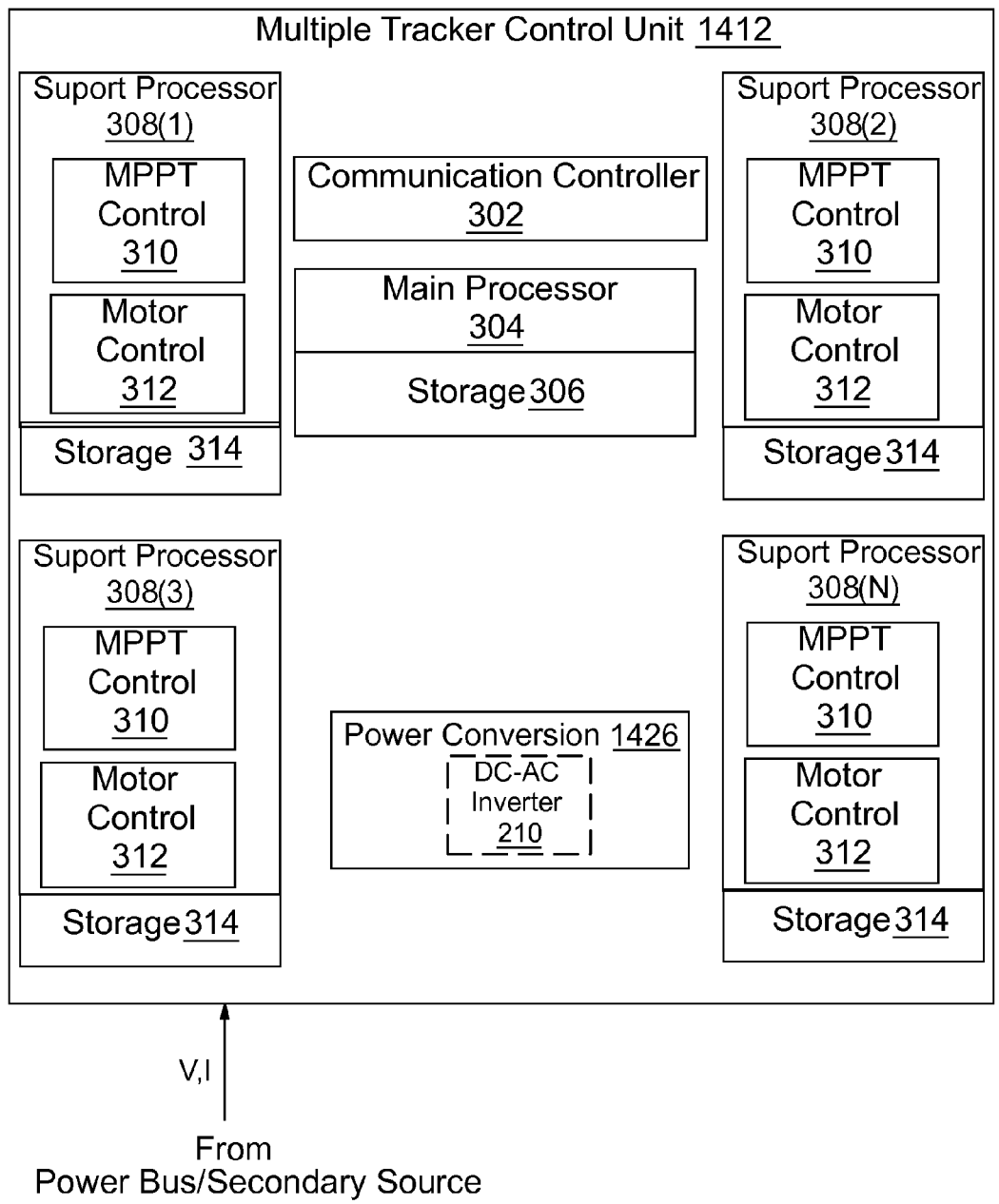
FIG. 16 is a block diagram illustration of a multiple tracker control unit used in the system of FIG. 14 according to an example embodiment.

FIGS. 14-16 disclose a further embodiment of a solar power generating system 1400 that is similar to the above-described solar power generating system 1100 except for differences that will be apparent from the Figures and the following description. As shown in the block diagram of FIG. 14, the tracker support units 1210 are connected in series. Each of the tracker support units 1210 are provided with a power conversion module 1406 with a DC-DC converter 208 as shown in FIG. 15, and the power conversion module 1426 of the multiple tracker control unit 112 includes a central DC/AC inverter as shown in FIG. 16. The communication controller 204 transmits signals that represent the power output from the power conversion module 1406 over link 118 to the multiple tracker control unit 1412 and receives MPPT control signals back from the multiple tracker control unit 1412 for implementation of MPPT power conversion by the power conversion module 1406. The central DC/AC inverter 210 of the multiple tracker control unit 1412 converts the direct current signal received from the DC-DC converters 208 into an AC signal for supply to the power bus 114.

At least some example embodiments of this invention provide an integrated circuit (chip or chipset) that accommodates a single or a plurality of Maximum Power Point Tracking (MPPT) DC/DC converters and/or MPPT DC/AC inverters as well as a single or a plurality of mechanical solar panel positioning tracker controllers, which consist of motor driver support electronics, sensory management, microprocessor control with adaptive, learning and auto-calibrating algorithms, onto a single System on Chip (SoC).

The integration of solar tracker functionality with one or more MPPT DC/DC and/or MPPT DC/AC power optimizers with their support chip sets onto a single SoC for controlling a solar collection module can comprise a plurality of solar collection panels in a single assembly. In at least some applications, the system on chip will be able to control solar trackers as well as controlling the power conversion of single or multiple solar power systems. Incorporating discrete components into a single ASIC solution can in some applications reduce form factor, costs, and failure modes within the system.

The SoC can have the ability to perform parallel MPPT on several different photovoltaic sources. It is also appropriate to have the maximum power point from the power optimization portion to calibrate or drive the solar tracker so that it will follow the sun without being affected by mechanical, electrical, and environmental offsets. The SoC incorporates integrated communication areas, such as power line communication, and/or RS485 can be embedded within the chipset allowing a very versatile easily deployable system for a wide variety of applications.

The main CPU (processor core) communicates internally with other processor(s) that govern the maximum power point tracking and DC-DC/AC conversion portion and provide information such as power production of the panels to the main controller. The main controller then uses this information to process and calibrate its primary responsibility, which is the tracker controls. Information such as maximum power point of the panel can calibrate mechanical, electrical and environmental offsets so that the tracker can function in any environment. The large thermal components from power conversion circuitry such as the motor driver H-Bridges and DC-DC conversion FETs can also be integrated. Multiple processor cores to drive multiple tracker solutions are also possible, which can provide parallel control rather than a sequential control based system.

The entire system can thus provide an enhanced level of tracking control allowing a wide range of compensation to improve the tracking accuracy throughout the life cycle of the solar power system.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The above description is intended to describe example embodiments of the invention from which numerous variations and modifications are possible.

The invention claimed is:

1. A photovoltaic (PV) generating system comprising:
a plurality of PV tracker units, each comprising:
at least one PV panel comprising a plurality of PV generators connected to output electrical power; and
an actuator for positioning the at least one PV panel in two axes;
at least one of the PV panels being connected in series with another of the PV panels to form a serially connected PV panel pair;
a multiple tracker control unit in communication with the plurality of PV tracker units, the tracker control unit monitoring the output electrical power of the PV panels and controlling, in dependence on the monitored output electrical power, both: (i) power conversion of the output electrical power and (ii) the actuators of the PV tracker units, to optimize power output for the plurality of PV tracker units,
the multiple tracker control unit being configured to perform a calibration routine during which a calibrated trajectory for each PV panel is calculated in dependence on the output electrical power therefrom, and wherein power conversion of the output electrical power from each PV panel comprises performing a DC-DC conversion to output a substantially constant voltage electrical power output signal, wherein the calibration routine comprises, for each serially connected pair of PV panels:
acquiring calibration data for each of the PV panels of the PV panel pair at a plurality of sample positions along respective predetermined trajectories of movement of the PV panels by:
at each sample position: (i) monitoring the power output from the PV panel pair as the orientation of a first one of the PV panels is incrementally varied in opposite directions relative to a first axis and determining for the first axis the orientation of the first one of the PV panels at which the monitored power is optimized; (ii) monitoring the power output from the PV panel pair as the orientation of the first one of the PV panels is incrementally varied in opposite directions relative to a second axis and determining for the second axis the orientation of the first one of the PV panels at which the monitored power is optimized; (iii) monitoring the power output from the PV panel pair as the orientation of a second one of the PV panels is incrementally varied in opposite directions relative to a first axis and determining for the first axis the orientation of the second one of the PV panels at which the monitored power is optimized; (iv) monitoring the power output from the PV panel pair as the orientation of the second one of the PV panels is incrementally varied in opposite directions relative to a second axis and determining for the second axis the orientation of the second one of the PV panels at which the monitored power is optimized; and
adjusting the predetermined trajectory in dependence on the calibration data to derive the calibrated trajectory.

2. The PV generating system of claim 1 wherein the multiple tracker control unit comprises a single chip integrated circuit (IC) controlling both the power conversion and the actuators of the PV tracker units to optimize power output for the plurality of PV tracker units.

3. The PV generator system of claim 2 wherein the IC comprises multiple processor cores including processor cores that are each associated with a respective PV tracker unit and perform calculations controlling the power conversion of electrical power therefrom.

4. The PV generator system of claim 3 wherein the processor cores that perform calculations controlling the power conversion are configured to perform maximum power point tracking for their associated PV tracker units.

5. The PV generator system of claim 2 wherein the IC comprises, for each PV tracker unit, one or both of an on-chip DC-DC converter or DC-AC inverter performing the power conversion.

6. The PV generator system of claim 2 wherein the IC comprises one or both of (i) a DC/DC converter for regulating the voltage or current of a plurality of the PV tracker units; and (ii) a DC/AC inverter for converting a direct current signal received from a plurality of the PV tracker units into an AC signal for supply to a power bus.

7. The PV generator system of claim 2 wherein each PV tracker unit comprises a DC/DC converter for regulating the voltage or current of the PV tracker unit; and the IC comprises a DC/AC inverter for converting direct current signal received from a plurality of the PV tracker units into an AC signal for supply to a power bus.

8. The PV generator system of claim 2 wherein each processor core associated with a PV tracker unit controls a trajectory of the actuator of its associated PV tracker unit.

9. The PV generator system of claim 8 wherein the IC comprises on-chip motor driver circuits for driving the actuators of the PV tracker units.

10. The PV generator system of claim 1 wherein the PV tracker units each include an associated tracker support circuit that communicates over one or more communication links with the multiple tracker control unit, each tracker support circuit comprising a motor driver for driving the actuator of the associated PV tracker unit and a power conversion circuit including a DC-DC converter or a DC-AC inverter, the motor driver and the power conversion circuit operating under control of signals received from the multiple tracker control unit.

11. The PV generator system of claim 10 wherein the one or more communication links include a power line communications link.

12. The PV generating system of claim 1 wherein the multiple tracker control unit comprises multiple processor cores in a chipset carried on a common substrate collectively controlling both the power conversion and the actuators of the PV tracker units to optimize power output for the plurality of PV tracker units.

13. A tracker control unit for controlling a plurality of PV tracker units that each have at least one PV panel with PV generators connected to output electrical power and an actuator for positioning the at least one PV panel in two axes, at least one of the PV panels being connected in series with another of the PV panels to form a serially connected PV panel pair, the tracker control unit being configured to monitor the output electrical power of the PV panels and control, in dependence on the monitored output electrical power, both: (i) power conversion of the output electrical power and (ii) the actuators of the PV tracker units, to optimize power output for the plurality of PV tracker units,
the tracker control unit being configured to perform a calibration routine during which a calibrated trajectory for each PV panel is calculated in dependence on the output electrical power therefrom, and wherein power conversion of the output electrical power from each PV panel comprises performing a DC-DC conversion to output a substantially constant voltage electrical power output signal, wherein the calibration routine comprises, for each serially connected pair of PV panels:
acquiring calibration data for each of the PV panels of the PV panel pair at a plurality of sample positions along respective predetermined trajectories of movement of the PV panels by:
at each sample position: (i) monitoring the power output from the PV panel pair as the orientation of a first one of the PV panels is incrementally varied in opposite directions relative to a first axis and determining for the first axis the orientation of the first one of the PV panels at which the monitored power is optimized; (ii) monitoring the power output from the PV panel pair as the orientation of the first one of the PV panels is incrementally varied in opposite directions relative to a second axis and determining for the second axis the orientation of the first one of the PV panels at which the monitored power is optimized; (iii) monitoring the power output from the PV panel pair as the orientation of a second one of the PV panels is incrementally varied in opposite directions relative to a first axis and determining for the first axis the orientation of the second one of the PV panels at which the monitored power is optimized; (iv) monitoring the power output from the PV panel pair as the orientation of the second one of the PV panels is incrementally varied in opposite directions relative to a second axis and determining for the second axis the orientation of the second one of the PV panels at which the monitored power is optimized; and adjusting the predetermined trajectory in dependence on the calibration data to derive the calibrated trajectory.

14. The tracker control unit of claim 13 comprising a single chip integrated circuit (IC) configured to control both the power conversion and the actuators of the PV tracker units to optimize power output for the plurality of PV tracker units.

15. The tracker control unit of claim 14 wherein the IC comprises multiple processor cores including processor cores that are each associated with a respective PV tracker unit and perform calculations controlling the power conversion of electrical power therefrom.

16. The tracker control unit of claim 15 wherein the processor cores that perform calculations controlling the power conversion are configured to perform maximum power point tracking for their associated PV tracker units.

17. The tracker control unit of claim 14 wherein the IC comprises at least one of on-chip DC-DC converters or on-chip DC-AC inverters performing the power conversion.

18. The tracker control unit of claim 14 wherein the IC comprises on-chip motor driver circuits for driving the actuators of the PV tracker units.

19. The tracker control unit of claim 14 wherein the multiple tracker control unit comprises multiple processor cores in a chipset carried on a common substrate collectively controlling both the power conversion and the actuators of the PV tracker units to optimize power output for the plurality of PV tracker units.

* * * * *